United States Patent [19]
Thigpen, Jr. et al.

[11] 3,807,500
[45] Apr. 30, 1974

[54] METHOD OF TREATING SUBTERRANEAN FORMATIONS TO IMPROVE PERMEABILITY

[75] Inventors: Arnold B. Thigpen, Jr.; Jack F. Tate, both of Houston, Tex.

[73] Assignee: Texaco Inc., New York, N.Y.

[22] Filed: Mar. 12, 1973

[21] Appl. No.: 340,504

[52] U.S. Cl. .................................. 166/303, 166/307
[51] Int. Cl. ............................................. E21b 43/24
[58] Field of Search ............ 166/303, 312, 305, 307

[56] References Cited
UNITED STATES PATENTS

| | | | |
|---|---|---|---|
| 3,208,528 | 9/1965 | Elliot | 166/305 R |
| 3,444,931 | 5/1969 | Braden | 166/305 R |
| 3,621,913 | 11/1971 | Braden, Jr. | 166/305 R |
| 3,710,863 | 1/1973 | Webster | 166/303 |

OTHER PUBLICATIONS

Smith et al., Potassium, Calcium Treatments Inhibit Clay Swelling, Nov. 30, 1964, The Oil and Gas Journal, pages 80, 81.

*Primary Examiner*—James A. Leppink
*Attorney, Agent, or Firm*—T. H. Whaley; C. G. Ries

[57] ABSTRACT

A method for treating subterranean formations containing water sensitivity clays which have sustained permeability damage due to contact with fresh water, to increase the permeability of the subterranean formations, comprising injecting into the formation via wells drilled into such formations a solution of potassium chloride followed by treating with a heated fluid including steam having a temperature of at least 300° F. for several hours, followed by treating the formation with mud acid or retarded mud acid.

11 Claims, 3 Drawing Figures

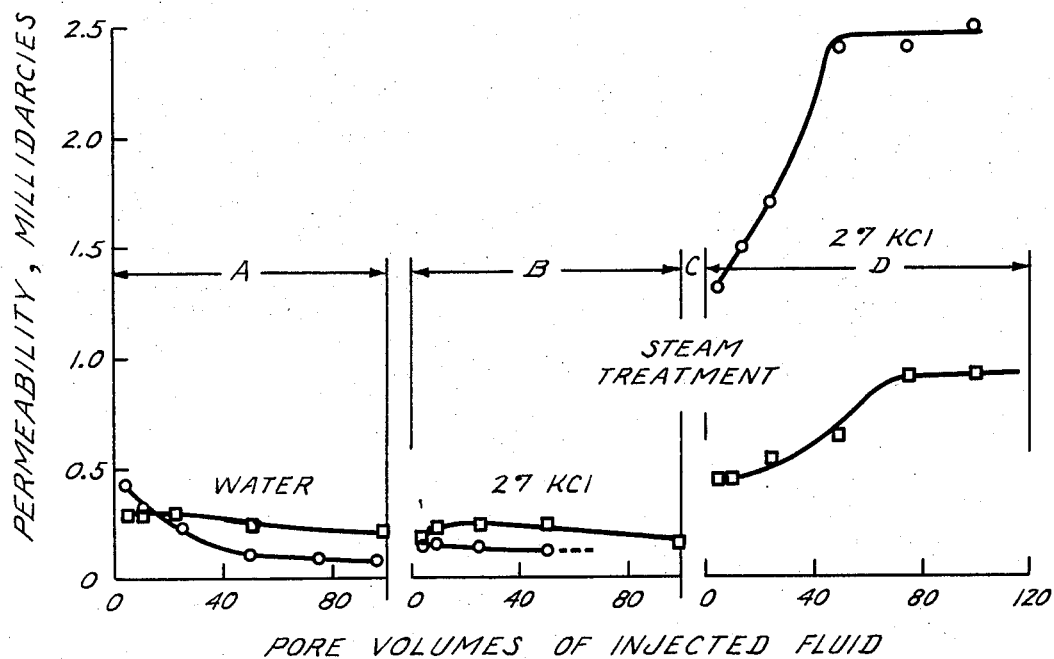
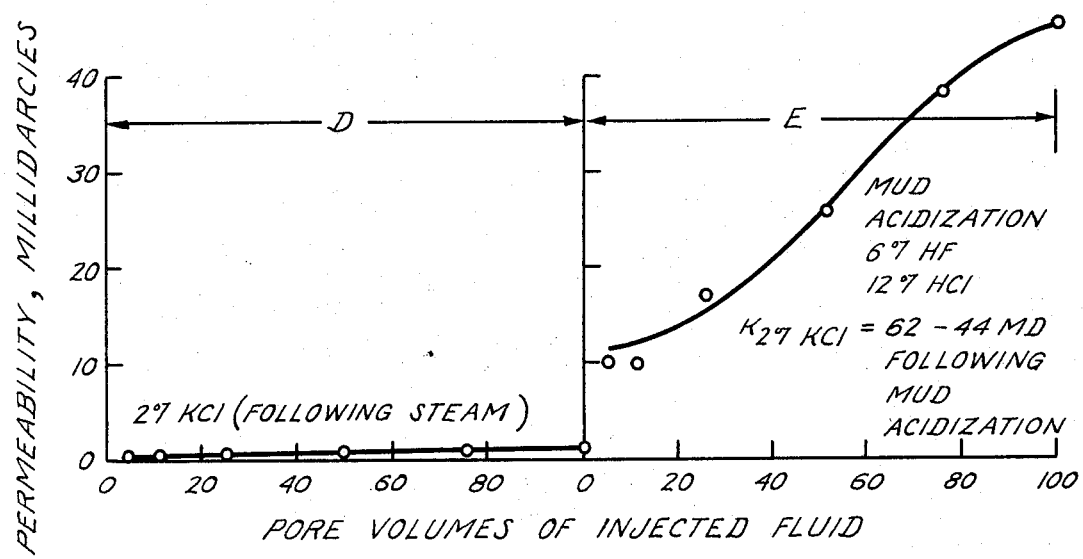

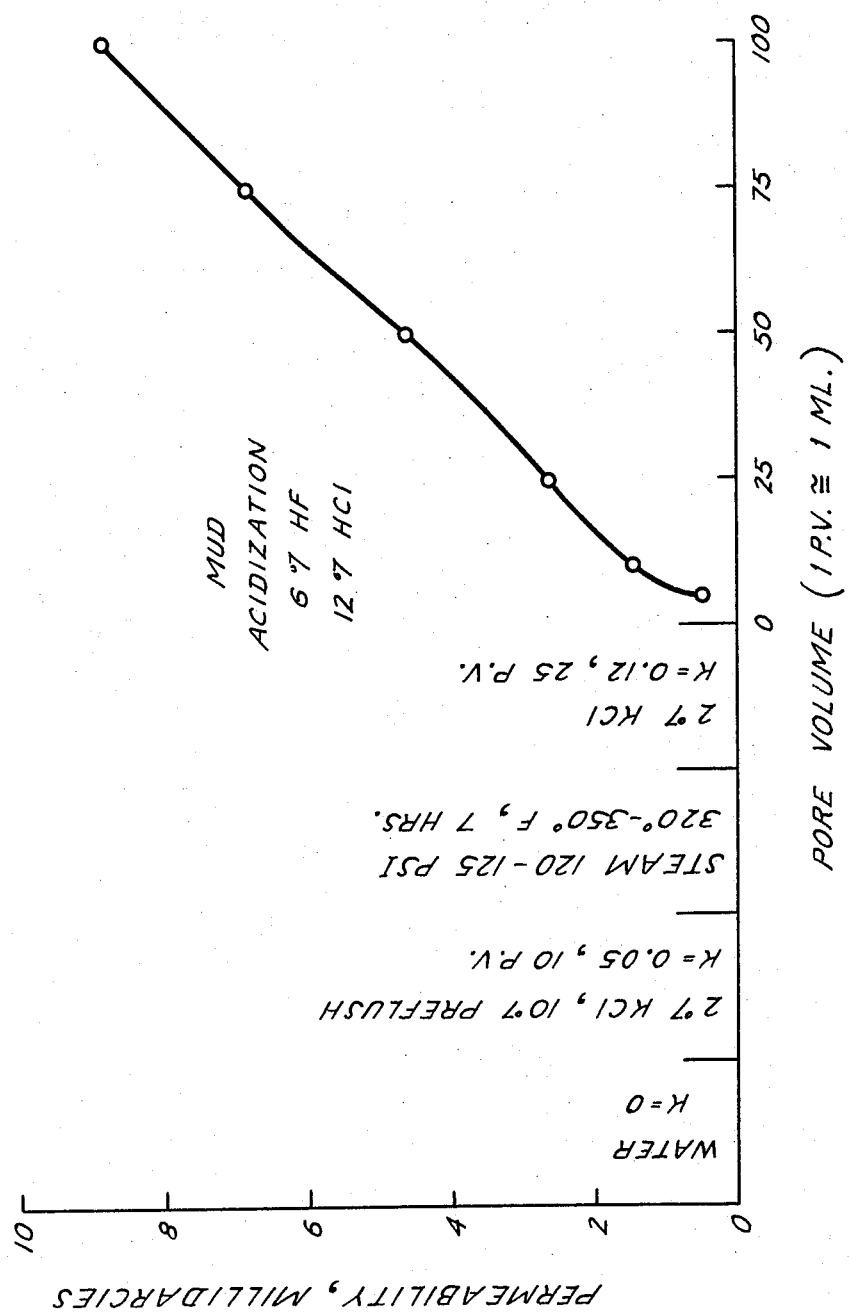

METHOD OF TREATING SUBTERRANEAN FORMATIONS TO IMPROVE PERMEABILITY

BACKGROUND OF THE INVENTION

1. Field of the Invention

This invention relates to a method for treating subterranean formations, such as petroleum containing subterranean formations, for the purpose of increasing the permeability of such formations to facilitate the flow of hydrocarbon therefrom. More particularly, this invention pertains to a method for treating subterranean formations which contain water sensitivity clay to improve the formation permeability, by injecting potassium chloride and steam, followed by injection of mud acid or retarded mud acid.

2. Description of the Prior Art

Petroleum is found in subterranean formations or reservoirs in which it has accumulated, and recovery is initially accomplished by pumping or permitting the petroleum to flow to the surface through wells drilled into the subterranean formation for that purpose. In order to obtain production of petroleum from such formations, it is necessary to have a number of conditions present, including an adequately high concentration of petroleum, and sufficient permeability or interconnected flow channels throughout the formation to permit the flow of fluids therethrough if sufficient pressure is applied to the fluid.

Subterranean petroleum containing formations are known which contain a sufficient concentration of petroleum, but the initial permeability of the formation is too low to permit recovery of petroleum contained therein by primary or secondary recovery techniques. Fracturing and acidization of such so-called tight formations are frequently employed with varying degrees of success, but there are many formations which still resist all attempts by known means to recover petroleum from them.

In still other instances, petroleum containing subterranean formations are known in which the rock or mineral matrix contains clay or clay like materials which swell on contact with water, and this swelling phenomena is especially severe when the formation is contacted with relatively fresh water or water containing low concentrations of salts dissolved therein. When these clay minerals swell, such as after being contacted with fresh water, there is an immediate reduction in the permeability to fluid flow, and once this permeability loss has occurred, it is usually difficult or impossible to reverse. The loss of permeability upon contact between such sensitive formations with fresh water may be caused by the swelling of certain clays, especially montmorillonite, or the interconnected flow channels may be blocked by mobile fine particles which are dislodged by the flow of fluids therethrough. Such fines are frequently hydrated clay particles or finely divided silica. In addition to the montmorillonite group of clays, kaolin clay and certain illite minerals are also known to swell upon hydration when contacted with fresh water, producing a reduction in the permeability of the formation. Some formations are known which contain only a single species of water sensitivity clay material such as those discussed above, or combinations of these materials frequently occur either as mixtures or as mixed layers of clay.

Permeability loss generally occurs when a low salinity fluid, generally a fluid which is not indigenous to the formation is introduced into the formation by a variety of means. For example, the filtrate from aqueous drilling fluids can invade the formation and cause loss of permeability. Water injected for the purpose of displacing oil can also reduce permeability. Water from leaks in or behind the casing, or ground water associated with the formation may also cause permeability loss. A particularly serious problem has been noted in the recent adoption of steam injection for a means for secondary or supplemental recovery of petroleum. When steam is injected into a subterranean formation for the purpose of stimulating oil recovery therefrom, steam vapors travel considerable distance into the formation, losing heat as they progress through the cooler formation and ultimately condense into a liquid. The condensate from injected steam is generally pure water which causes a serious deterioration of permeability if water sensitive clays are present in the formation.

Whether the low permeability condition is initially present in the formation or induced into the formation by injection into the formation of relatively fresh water, there are numerous prior art teachings which have been successful to varying degrees in certain instances. For example, U.S. Pat. No. 3,543,858 (1970) describes a method whereby potassium chloride is injected into a a subterranean formation and the formation is then heated to 260° C. (500° F.) for a week. Use of this procedure brings about a change of the swelling montmorillonite clays to a non-swelling illitic type of clay. Although this procedure accomplishes a significant and permanent change in the permeability, the practical problems and cost associated with heating a significant portion of a subterranean reservoir to 500° F. for a week are enormous. U.S. Pat. No. 3,237,692 (1966) teaches the injection of steam at a temperature of 185° C. or above and a soluble alkali metal salt into the water damaged formation to achieve permeability restoration. In pending application Ser. No. 247,546 filed Apr. 26, 1972, there is disclosed an improved method for increasing the permeability of a formation which has experienced permeability loss due to contacting water sensitivity clays with fresh water, the process comprising treating the reservoir with potassium chloride at about 100° C. for several hours.

While the above-described prior art teachings are effective in some instances for increasing the permeability of formations containing water sensitive clays which have been contacted with fresh water, there are numerous formations in which the permeability loss is so severe that a satisfactory permeability cannot be obtained by any of the teaching of the prior art. Accordingly, there is a substantial need for a process for treating a formation having a permeability as low as one millidarcie or below, which cannot be treated adequately by techniques known in the prior art to achieve a permeability suitable for oil recovery operations.

SUMMARY OF THE INVENTION

We have discovered, and this comprises our invention, that the permeability of severely water damaged formations may be improved dramatically by injecting there into an aqueous potassium chloride solution followed by treating with steam at a temperature of from 300° to 400° F. for a period of time followed by treatment with mud acid, e.g., a mixture of hydrochloric acid and hydrofluoric acid. Our invention therefore incorporates the method of treating formations using the stated formulation in the critical sequence given.

DESCRIPTION OF THE DRAWINGS

FIG. 1 illustrates the permeability variations of a water sensitive clay containing formation which is contacted first with water, then with a 2 percent potassium chloride solution, then treated with steam, and then treated again with potassium chloride.

FIG. 2 illustrates the subsequent treatment of the core described above with additional potassium chloride following the steam treatment, and then treated with mud acid.

FIG. 3 illustrates the sequential treatment of another water sensitive clay containing formation core according to the teachings of our invention.

DESCRIPTION OF THE PREFERRED EMBODIMENTS

Generally, the process of our invention is carried out by first contacting a fluid filled formation containing clay swelled by water, with an aqueous solution of potassium chloride. The formation is then heated by conventional means such as injection of hot fluids including steam, the temperature of said fluids being from 300° to 400° F. and preferably from 350° F. to 380° F. for a period of time which will generally be less than one day, usually around 6 to 8 hours, and thereafter treating the formation with a quantity of mud acid, e.g., a mixture of hydrochloric and hydrofluoric acid, or mud acid containing an additive to retard its rate of reaction, for a period of from 0.25 to 24 hours.

The method of our invention may be applied, for example, to treat petroleum containing subterranean formations which are being flooded with an aqueous fluid including water, to drive the petroleum to production wells where it is transported to the surface. This is a commonly utilized form of supplemental oil recovery and generally employs at least one injection well and one spaced apart production well, although larger numbers of wells are frequently employed. The water or other fluid is injected into the production well which is completed so as to be in fluid communication with the oil containing formation, wherein the injected fluid displaces the petroleum toward the production well which is also completed so as to be in fluid communication with the petroleum containing formation. The injected fluid displaces and drives the petroleum toward the production well where it is produced to the surface. Water flooding is frequently undertaken in reservoirs without fully realizing the extent of water sensitivity of the formation matrix, and the first indication of this water sensitivity is manifested by the dramatic drop in injectivity at the injection well or wells. The severity of sensitivity in some formations is so great that permeabilities of 20 or 30 millidarcies will be reduced on contacting fresh water to a value of 1 millidarcie or less, even in the range of 0.1 millidarcie. Once the permeability of a water damaged formation has been reduced to a value below about 0.5 millidarcies, it is exceedingly difficult to restore permeability to a usable level, since most restorative processes involve the injection of a fluid into the formation. The low permeability prevents injection of sufficient treating chemical into the formation to permit significant restoration of permeability. The process of our invention is especially applicable to formations which have experienced fresh water damage to the extent that their permeabilities are reduced to a level below 1 millidarcie, which are difficult to treat effectively with procedures known in the prior art.

The several steps involved in the treating procedure of our invention are individually known in the prior art to achieve some increase in permeability of water damaged formations. We have discovered, however, that the use of certain specific procedures in a critical sequence will achieve a dramatic and unexpected increase in permeability of a water damaged clay containing formation.

The method of our invention may also be applied to the portion of the formation rock in the immediate vicinity of the production well, to increase the permeability of this portion of the formation whereby the productivity of the production well may be increased. Fresh water contact can occur in the interval immediately adjacent to the production well in a variety of ways, including invasion thereinto of filtrate from aqueous drilling fluids, and from completion operations, as well as water leakage from other zones around the casing, all of which result in severe permeability loss in the portion of the formation immediately adjacent to the production well bore. Since the significance of permeability loss is greatest in the area closest to the well bore, a satisfactory increase in productivity can sometimes be accomplished by treating only a small interval adjacent to the well bore, even though the treatment does not affect all of the water damaged area. If possible, the maximum benefit will be achieved if sufficient treating composition to contact essentially all the water damaged area is injected into the formation adjacent to the well bore.

The extent of contact between extraneous fresh water and the water sensitivity clay portion of the formation will vary considerably in the two instances described above. The water damage will occur in considerably greater depth in the instance of water injection than the type of damage occurring around the production wells caused by drilling fluid filtrate invasion, etc. Accordingly, the quantity of treatment chemicals necessary to correct the problem will vary considerably, and it is desirable to have some idea concerning the origin of the problem in order to determine the correct quantity of treating composition to be used.

The concentration of potassium chloride in the first treating solution injected into the formation will vary from about 0.5 percent by weight to about 10 percent by weight and is preferably between about 1 and 5 percent by weight. In the instance of treating water damaged formation confined to the immediate vicinity of the well bore, it is satisfactory to inject from about 40 gallons of potassium chloride solution per foot of formation thickness. In the instance of water damage resulting from injecting fresh water for purposes of performing supplemental recovery operations, it is satisfactory to inject from about 1 to about 4 pore volumes of potassium chloride solution into the injection well.

The injected potassium chloride should be followed immediately by a heating procedure which is most conveniently accomplished by injecting a heated fluid into the formation. Ordinarily this will be accomplished by injecting steam into the formation, and maintaining injection of steam into the formation for a sufficient period of time to bring about the maximum permeability restoration from the use of injected potassium chloride solution. The steam temperature may be from about 300° F. to about 400° F. and preferably from about 350° F. to about 380° F., and steam injection should be maintained for a sufficient period of time to expose that portion of the formation contacted by the potassium chloride solution to the treating temperature for a period less than one day, usually 6 to 8 hours being satisfactory.

The final treating phase will involve injecting mud acid, which will generally comprise a mixture of hydrofluoric and hydrochloric acid. From about 2 to about 9 percent by weight hydrofluoric acid and from about 6 to about 18 percent by weight hydrochloric acid may be used, and a generally satisfactory mixture comprises 6 percent hydrofluoric and 12 percent hydrochloric. In the instance of treating water damage confined to the vicinity of the production well bore, from about 40 gallons of mud acid per foot of formation thickness may be injected into the formation. In the instance of utilizing the process of our invention for the treatment of water damaged formation in a formation being subjected to supplemental oil recovery of the type wherein fresh water contacts a significant portion of the formation, from about 0.25 to about 4 pore volumes of mud acid should be injected into the formation.

In certain applications and in order to achieve the maximum permeability improvement from the use of the process of our invention, other ancillary treatments may be used to correct specific problems that are present concurrently with the water damage related permeability loss. For example, a paraffin solvent, such as xylene, toluene, chlorinated aliphatic materials, and carbon disulfide may be injected and circulated down the well bore prior to injection of the potassium chloride solution to remove deposited asphaltenes and residual oil from the well bore face. The solvents should be removed before the next step. A small amount of mud acid may be injected into the well to correct formation face damage from prior drilling operations. This may then be displaced from the well bore by water or other materials. A brief injection of steam to induce flow of asphaltenes and other detrimental material may also be utilized with benefit, especially where paraffin deposition is a serious problem. The 2 to 10 percent aqueous potassium chloride solution is then injected into the formation, followed by steam injection, followed by the injection of mud acid, followed by soak period of from about 1 to 6 hours to achieve the maximum results.

FIELD EXAMPLE

In order to better illustrate the process of our invention, the following field example is provided. This is not intended to be limitative or restrictive, but is included only for the purposes of illustrating specifically the means of application of the process of our invention to field problems.

A water flooding secondary recovery operation is undertaken in a formation located at a depth of 4,000 feet, and terminated prematurely after the injectivity of water into the injection wells declines dramatically over a relatively short period of time. Core analysis indicate that the average permeability of the formation had dropped to 0.2 millidarcies and it is determined that the drop in permeability is occassioned by contacting water sensitivity clays present in the formation with fresh injection water.

Approximately 1 pore volume of 2 percent by weight potassium chloride dissolved in water is injected into the formation, and this is followed by injection of steam at 360° F. for 8 hours. An increase in injectivity is observed during the course of steam injection, but the extent of increase is insufficient to satisfy the requirements of the water injection program. After steam injection is terminated, 1 pore volume of retarded mud acid consisting of an aqueous solution containing 6.0 percent by weight hydrofluoric acid and 12 percent by weight hydrochloric acid and 5 percent polyvinylpyrrolidone is injected into the formation, and the wells are shut in for 12-24 hours to permit the injected retarded mud acid to react completely with the formation which it contacts. Water injection is continued thereafter and it is determined that the injectivity has returned to a value approximately equal to the initial injectivity, and remains essentially constant thereafter.

It is also determined that the production wells in the same field have suffered a loss in productivity because of permeability loss resulting from the swelling of water sensitivity clays on contacting fresh water. The production wells are first treated by contacting the formation face with the paraffin solvent, in this instance 75 gallons of xylene is used for this purpose. The solvent is then displaced from the well, and the well bore is next treated with conventional mud acid to remove formation face damage caused by prior drilling operations. Steam is injected for a brief period to induce flow of asphaltenes and other detrimental material from the well bore, after which all of the material is swabbed from the well bore. Since the formation thickness averages 25 feet, 1,000 gallons of a 5 percent aqueous potassium chloride solution is injected into the formation, followed by the injection of steam at 360° F. for 8 hours. Since the damage is known to have occurred at some dpeth into the formation adjacent to the well bore, a retarded mud acid is utilized comprising 6 percent hydrofluoric acid, 12 percent hydrochloric acid and 5 percent polyvinylpyrrolidone. The presence of polyvinylpyrrolidone retards the activity of the mud acid, permitting the mud acid to penetrate further into the pretreated formation, thereby achieving in depth permeability improvement. The production well is then shut in for approximately 12-24 hours, after which the well is put back on production. A 200 percent improvement of productivity from the wells is realized as a result of this treatment.

EXPERIMENTAL

In order to demonstrate the operability of our invention, and further to define specifically the optimum concentrations, volumes, and times for treatment, the following experimental work was performed.

A series of tests were performed utilizing 1 inch plugs cut from cores taken at a depth of 3,926 feet from the Norm Richardson heirs well No. 2 in the Sespe zone, Ventura County, California. This formation is known to be highly water sensitive and it appears that the formation in the vicinity of this well has undergone extensive permeability loss as a result of contact with fresh water. The plugs were mounted for laboratory study in a device which permits passing fluid through the plugs, while measuring flow rate and pressure drop in order to determine permeability response to the various treatments under controlled laboratory conditions.

Turning now to FIG. 1, the permeabilities of a pair of plugs subjected to the passage of relatively fresh water is demonstrated in Section A of FIG. 1, wherein the permeability drops from slightly less than 0.5 millidarcies to approximately 0.25 millidarcies. In Section B of FIG. 1, 2 percent potassium chloride solution is flowed through the plugs, with little change in permeability. In Section C, the plug is subjected to steam treatment for 6 hours at a pressure of 120 to 125 pounds per square inch, corresponding to a temperature of 320° to 350° F. After the 6 hours steam treatment, the permeability had increased to approximately 1.4 millidarcies. Additional potassium chloride was passed through the core, and the permeability increased gradually to about 2.5 millidarcies and levelled off at about this figure.

In FIG. 2, the permeability response to continued treatment of the same core is demonstrated, except that at a scale change for the permeability value was necessitated because of the dramatic response of the final treatment phase. It can be seen that the passage of approximately 100 pore volumes of 2 percent potassium chloride solution resulted in only modest improvements in permeability. In the E Section of FIG. 2, the response to the final step, specifically mud acidization using 6 percent hydrofluoric and 12 percent hydrochloric acid, is given. It can be seen that the permeability increased dramatically, and as additional pore volumes of 2 percent potassium chloride solution is pumped through the plug, the permeability continues to increase to a value above about 40 millidarcies.

EXAMPLE II (FIG. 3)

Another laboratory experiment was done with a plug obtained from the Harvey Well No. 28 also from the Sespe Formation in Ventura, California. An attempt was made to force water through the plug and it was determined that the permeability was essentially 0 to the flow of fresh water. Two percent by weight potassium chloride was then introduced into the core, and after 10 pore volumes the permeability was measured to be approximately 0.05 millidarcies, which is still essentially useless for oil recovery operations. The plug was then treated with steam at 120 to 125 pounds per square inch, 320° to 350° F. for 7 hours. The permeability to 2 percent potassium chloride was then determined to be 0.12, and it remained essentially stable at this value after 25 pore volumes of potassium chloride solution had been flowed through it. The plug was then treated with 100 pore volumes of 6 percent hydrofluoric acid and 12 percent hydrochloric acid, and allowed to stand 0.25 hours. Thereafter potassium chloride solution was flowed through the plug, and the permeability began increasing with increasing amounts of fluid passage. The permeability reached a value of approximately 10 millidarcies after 100 pore volumes had been passed through the plug.

In each of the above experiments, subjection of the plug to mud acid treatement without prior conditioning with potassium chloride and steam resulted in essentially no improvement of permeability. Similarly, treatment of the core with mud acid followed by a steam and potassium chloride resulted in essentially the same permeability improvement achieved with potassium chloride and steam without mud acidization. Thus, it can be seen that a dramatic and unexpected improvement in permeability, as much as 40 to 100 fold, is achieved if the material is subjected to treatment with potassium chloride, then subjected to steam treatment for a period of time, and finally treated with mud acid. It will be appreciated that since essentially no improvement is achieved from the use of one of the treatment procedures, specifically mud acid alone, and since the use of mud acid followed by potassium chloride and steam does not achieve any greater improvement in permeability than is realized by the use of potassium chloride and steam alone, then a synergistic result is obtained if the treatment is performed in the required order.

Thus, we have shown by the foregoing laboratory data that formations which contain water sensitive clays, and which have sustained severe permeability loss due to contact with fresh water, can be treated so as to achieve a dramatic improvement in permeability by contacting said formation first with potassium chloride solution, then exposing the formation to heating, for example by steam for a period of time, and then contacting said formation with a mixture of hydrofluoric and hydrochloric acid. The extent of improvement obtainable in severely water damaged cores is substantially in excess of what one skilled in the art would expect from the results obtainable from the separate treating techniques taken individually. Numerous variations of this method will be apparent to those skilled in the art, and the foregoing examples are intended only to be illustrative of the invention, the true spirit and scope of which are defined more precisely hereinafter in the appended claims.

We claim:

1. A method for treating a subterranean petroleum containing reservoir composed partly of water sensitive clay, said reservoir containing interconnected flow channels, the permeability of said reservoir having been reduced by contact with water causing clay in the formation matrix to swell, said reservoir being penetrated by at least one production well, comprising:
   a. Contacting the reservoir with an aqueous solution of potassium chloride;
   b. Heating the contacted portion of the reservoir to a temperature of from about 300° F. to about 400° F. for a period less than 1 day; and
   c. Contacting the portion of the reservoir contacted in a. with a mud acid comprising hydrochloric acid and hydrofluoric acid for a period of 0.25 to 24 hours.

2. A method as recited in claim 1 wherein the concentration of potassium chloride is from 1 to 5 percent by weight.

3. A method as recited in claim 1 wherein the formation is penetrated by at least one injection well, wherein from about 1 to about 4 pore volumes of potassium chloride are injected into an injection well.

4. A method as recited in claim 1 wherein from about 20 to about 60 gallons of potassium chloride per foot of formation thickness are injected into a producing well penetrating said formation.

5. A method as recited in claim 1 wherein the formation is heated for a period of from about 4 to about 24 hours.

6. A method as recited in claim 1 wherein the mud acid contains from about 2 to about 9 percent by weight hydrofluoric acid.

7. A method as recited in claim 1 wherein the mud acid contains from about 6 to about 18 percent by weight hydrochloric acid.

8. A method as recited in claim 1 wherein the mud acid also contains from about 2 to about 6 percent by weight of a vinylpyrrolidone polymer.

9. A method as recited in claim 1 wherein the formation is contacted with mud acid for a period of from about 0.25 to about 24 hours.

10. A method as recited in claim 1 wherein from about 0.25 to about 4 pore volumes of mud acid are injected into the injection well.

11. A method as recited in claim 1 wherein about 20 to about 60 gallons of mud acid per foot of formation thickness are injected into the producing well completed in said formation.

* * * * *